(No Model.)

C. G. ANDERSON.
ELECTRICALLY PROPELLED DRIVE WHEEL.

No. 513,859.                  Patented Jan. 30, 1894.

WITNESSES                                      INVENTOR.
Karl A. Andrén                           Carl G. Anderson.
Chas. B. Brooks.                       by Alban Andrén
                                                        his — ATT'Y.

UNITED STATES PATENT OFFICE.

CARL G. ANDERSON, OF LYNN, MASSACHUSETTS.

ELECTRICALLY-PROPELLED DRIVE-WHEEL.

SPECIFICATION forming part of Letters Patent No. 513,859, dated January 30, 1894.

Application filed September 1, 1892. Serial No. 444,790. (No model.)

*To all whom it may concern:*

Be it known that I, CARL G. ANDERSON, a subject of the King of Sweden and Norway, and a resident of Lynn, in the county of Essex and State of Massachusetts, have invented new and useful Improvements in Electric Driving-Wheels for Vehicles, of which the following, taken in connection with the accompanying drawings, is a specification.

This invention relates to improvements in electric driving wheels for vehicles and it is carried out as follows, reference being had to the accompanying drawings, wherein—

Figure 1:
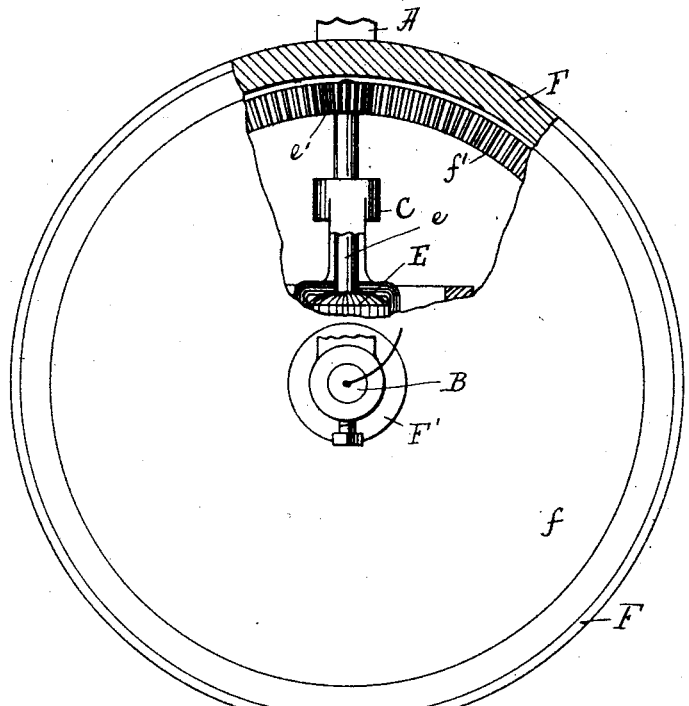
Figure 2:
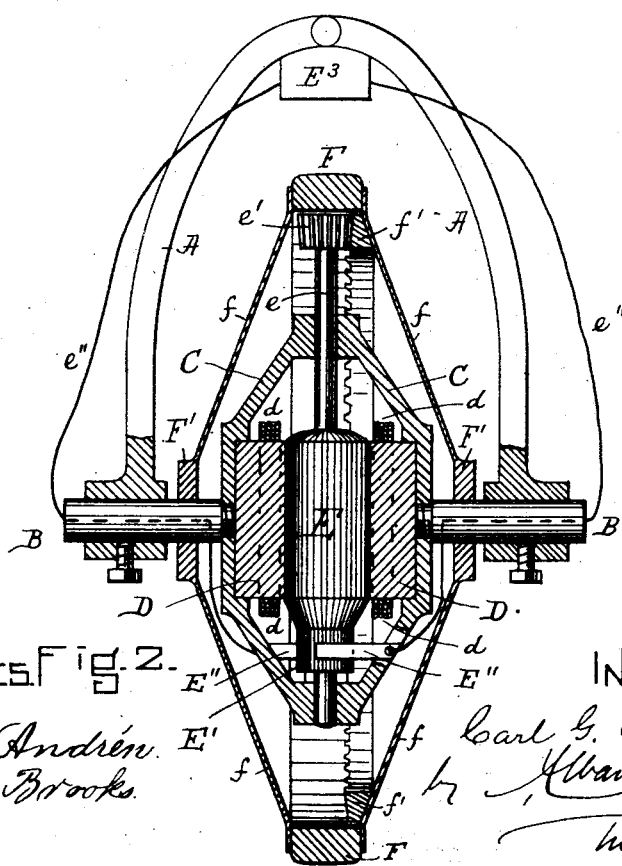

Figure 1 represents a side elevation of the wheel showing a portion of its casing removed, and Fig. 2 represents a central longitudinal section thereof.

Similar letters refer to similar parts wherever they occur on the different parts of the drawings.

A represents the frame of the vehicle which may be of any suitable size, shape or construction according to the nature of the vehicle to which the driving wheel is to be applied. To said frame is secured a pair of axles B, B, arranged longitudinally in a line with each other as shown. To said shafts is secured the motor frame C provided with field magnets D, D, and surrounding field coils $d$, $d$, as is common in electric motors. Between the field magnets D, D is arranged the rotary armature E, and $e$ is its axle which is journaled in bearings in the frame C as shown.

E' is the commutator connected to the armature E, and E'', E'' are the brushes held in contact with the said commutator and connected by means of wires $e''$, $e''$ to the storage battery $E^3$ or other source of electric force.

F is the rim of the wheel of which F', F' are the hubs which are loosely journaled on the shafts B, B and may be provided with anti-friction roller bearings if so desired so as to turn freely and without much friction on said shafts.

$f, f$ are inclosing plates by means of which the rim F is connected to the respective hubs F', F', and by means of which the electric motor is inclosed within the wheel so as to prevent dust, grit, dirt and moisture from reaching said inclosed motor.

To the armature shaft $e$ is preferably secured a pinion $e'$ the teeth of which mesh in a gear ring $f'$ secured to the interior of the wheel as shown in the drawings.

In practice I prefer to make the stationary shafts or motor supports B, B tubular so as to enable the circuit wires $e''$, $e''$ to be conducted through said shafts from the brushes to the storage battery as shown in Fig. 2. It will thus be seen that a rotary motion is imparted to the wheel F by the rotary motion of the armature E when the circuit is closed through the battery $E^3$.

This improved electric driving wheel is applicable to vehicles of any desired construction or it may be used as an electric driving mechanism for propelling vehicles or for conveying power and motion for mechanical purposes other than vehicles as may be desired without departing from the spirit of my invention.

Having thus fully described the nature, construction, and operation of my invention, I wish to secure by Letters Patent and claim—

1. In an electric driving wheel, the combination with the shafts B, B, upon which said wheel is loosely mounted, of a stationary electric-motor arranged within the wheel and secured to the shafts, and, intermediate gearing connecting the motor and wheel whereby a rotary motion is imparted to the latter, substantially as described.

2. In an electric driving wheel, the combination with the stationary hollow shafts B, B, upon which said wheel is loosely mounted, of a stationary electro-motor arranged within and inclosed by the wheel, gearing intermediate the wheel and motor, consisting of a gear ring $f'$, secured to the wheel, and a pinion $e'$, mounted upon the armature shaft and receiving power therefrom, said pinion adapted to mesh with the gear-ring whereby a rotary motion is imparted to the wheel, substantially as described.

3. In an electric driving wheel, the combination with the frame A, of a vehicle or other device, of the hollow stationary shafts B, B, secured to said frame, a wheel loosely mounted on the shafts, a stationary electro-motor inclosed within the wheel, and secured to the shafts, a pinion $e'$, carried by the armature shaft of said motor, and a gear-ring $f'$, mounted on the rim of the wheel, said pinion meshing with the gear-ring whereby the wheel is caused to revolve, substantially as, and in the manner set forth.

In testimony whereof I have signed my name to this specification, in the presence of two subscribing witnesses, on this 27th day of August, A. D. 1892.

CARL G. ANDERSON.

Witnesses:
ALBAN ANDRÉN,
J. H. BLANCHARD.